United States Patent
Imanishi et al.

(10) Patent No.: US 11,255,407 B2
(45) Date of Patent: Feb. 22, 2022

(54) EDDY CURRENT DAMPER

(71) Applicants: Nippon Steel Corporation, Tokyo (JP); Aseismic Devices Co., Ltd., Tokyo (JP)

(72) Inventors: Kenji Imanishi, Tokyo (JP); Hiroyuki Yamaguchi, Tokyo (JP); Ryohsuke Masui, Tokyo (JP); Shigeki Nakaminami, Tokyo (JP); Hidenori Kida, Tokyo (JP)

(73) Assignees: Nippon Steel Corporation, Tokyo (JP); Aseismic Devices Co., Ltd., Tokyo (JP)

( * ) Notice: Subject to any disclaimer, the term of this patent is extended or adjusted under 35 U.S.C. 154(b) by 95 days.

(21) Appl. No.: 16/638,496

(22) PCT Filed: Aug. 24, 2018

(86) PCT No.: PCT/JP2018/031458
§ 371 (c)(1),
(2) Date: Feb. 12, 2020

(87) PCT Pub. No.: WO2019/044722
PCT Pub. Date: Mar. 7, 2019

(65) Prior Publication Data
US 2020/0263759 A1    Aug. 20, 2020

(30) Foreign Application Priority Data

Aug. 29, 2017  (JP) .............................. JP2017-164572

(51) Int. Cl.
*F16F 15/03* (2006.01)
*F16F 6/00* (2006.01)
*E04B 1/98* (2006.01)

(52) U.S. Cl.
CPC ............ *F16F 15/035* (2013.01); *F16F 6/005* (2013.01); *E04B 1/98* (2013.01)

(58) Field of Classification Search
CPC .................................. F16F 15/035; F16F 6/005
See application file for complete search history.

(56) References Cited

U.S. PATENT DOCUMENTS 5,135,083 A  *  8/1992  Hayashi ..................... E05F 5/00
                                                                188/290

FOREIGN PATENT DOCUMENTS

CN       103821861 A  *  5/2014  ............ F16F 15/035
CN       207053362 U  *  2/2018
(Continued)

OTHER PUBLICATIONS

Oct. 16, 2018 (WO) International Search Report PCT/JP2018/031458.

(Continued)

*Primary Examiner* — Melanie Torres Williams
(74) *Attorney, Agent, or Firm* — Banner & Witcoff, Ltd.

(57) ABSTRACT

An eddy current damper includes a screw shaft, first permanent magnets, second permanent magnets, a cylindrical magnet holding member, a cylindrical conductive member, and a ball nut meshing with a screw shaft. The screw shaft is movable in the axial direction. The first permanent magnets are arrayed along the circumferential direction around the screw shaft. The second permanent magnet is arranged between the first permanent magnets, wherein the arrangement of magnet poles is inverted between the second permanent magnet and the first permanent magnet. The magnet holding member holds the first permanent magnet and the second permanent magnet. The conductive member is opposed to the first permanent magnets and the second permanent magnets with a gap therebetween. The ball nut is disposed inside the magnet holding member and the conductive member, and is fixed to the magnet holding member or the conductive member.

4 Claims, 10 Drawing Sheets

(56) References Cited

FOREIGN PATENT DOCUMENTS

| | | | | |
|---|---|---|---|---|
| DE | 102006053139 A1 | * | 5/2008 | .............. F02N 11/04 |
| EP | 2993374 A1 | * | 3/2016 | ......... F16H 25/2015 |
| GB | 2511856 A | * | 9/2014 | ............ F16F 15/035 |
| JP | H0586496 B2 | | 12/1993 | |
| JP | H9-177880 A | | 7/1997 | |
| JP | 2010-159837 A | | 7/2010 | |
| JP | 2012165554 A | * | 8/2012 | |
| JP | 2017-511867 A | | 4/2017 | |
| JP | 2017511867 A | * | 4/2017 | |
| WO | WO-2016041116 A1 | * | 3/2016 | ............ F16F 15/035 |

OTHER PUBLICATIONS

English Abstract of JP-H5-086496.
English Abstract of JP-H9-177880.

* cited by examiner

EDDY CURRENT DAMPER

TECHNICAL FIELD

The present invention relates to an eddy current damper.

BACKGROUND ART

In order to protect buildings against vibration caused by earthquakes and the like, vibration control devices are attached to the buildings. Such a vibration control device converts kinetic energy given to a building into another type of energy (for example, heat energy). In this way, large shaking of the building is suppressed. The vibration control device is, for example, dampers. The type of the damper includes, for example, an oil type and a shear resistance type. In general, oil type and shear resistance type dampers are often used in buildings. An oil damper dampens vibration by utilizing incompressible fluid in a cylinder. A shear resistance type damper dampens vibration by utilizing the shear resistance of viscous fluid.

However, the viscosity of the viscous fluid used in the shear resistance type damper particularly depends on the temperature of the viscous fluid. In other words, the damping force of the shear resistance type damper depends on temperature. Therefore, when the shear resistance type damper is used for a building, it is necessary to select an appropriate viscous fluid in consideration of the use environment. Further, in a damper using a fluid, such as of an oil type or a shear resistance type, the pressure of the fluid may increase due to temperature rise or the like, thereby causing damage to mechanical elements such as a sealing material of cylinder. A damper, the damping force of which is much less dependent on temperature, includes an eddy current damper.

Eddy current dampers are disclosed in, for example, Japanese Patent Publication No. 05-86496 (Patent Literature 1), Japanese Patent Application Publication No. 09-177880 (Patent Literature 2), and Japanese Patent Application Publication No. 2000-320607 (Patent Literature 3).

The eddy current damper of Patent Literature 1 includes a plurality of permanent magnets attached to a main cylinder, a hysteresis material connected to a screw shaft, a ball nut meshing with the screw shaft, and a sub-cylinder connected to the ball nut. The magnetic poles of the plurality of permanent magnets are differently arranged in an alternate manner. The hysteresis material is opposed to the plurality of permanent magnets, and is relatively rotatable. When kinetic energy is applied to the eddy current damper, the sub-cylinder and the ball nut move in the axial direction, and the hysteresis member is rotated by the action of the ball screw. As a result, the kinetic energy is consumed by hysteresis loss. Further, Patent Literature 1 describes that the kinetic energy is consumed by eddy current loss because eddy current is generated in the hysteresis material.

The eddy current damper of Patent Literature 2 includes a conductor rod and a plurality of ring-shaped permanent magnets arrayed in the axial direction of the conductor rod. The conductor rod penetrates through the inside of the plurality of ring-shaped permanent magnets. When the conductor rod moves in the axial direction, the magnetic flux passing through the conductor rod from the plurality of permanent magnets changes, and an eddy current is generated on the surface of the conductor rod. In this way, the conductor rod is subject to a force in a direction opposite to the moving direction. In other words, Patent Literature 2 describes that the conductor rod is subject to a damping force.

The eddy current damper of Patent Literature 3 includes a guide nut that meshes with a screw shaft, a conductive drum attached to the guide nut, a casing provided on the inner peripheral surface side of the drum, and a plurality of permanent magnets which are attached to an outer peripheral surface of the casing, and are opposed to an inner peripheral surface of the drum with a certain gap therebetween. Even if the guide nut and the drum rotate as the screw shaft advances and retreats, the drum inner peripheral surface and the permanent magnet do not graze with each other because they are not in contact with each other. Accordingly, Patent Literature 3 states that the number of times of maintenance is decreased as compared with an oil damper.

CITATION LIST

Patent Literature

Patent Literature 1: Japanese Patent Publication No. 05-86496

Patent Literature 2: Japanese Patent Application Publication No. 09-177880

Patent Literature 3: Japanese Patent Application Publication No. 2000-320607

SUMMARY OF INVENTION

Technical Problem

However, in the eddy current damper disclosed in Patent Literature 1, the ball nut moves in the axial direction of the screw shaft. In order to ensure such a movable range of the ball nut, the damper is large in size. In the eddy current damper of Patent Literature 2, since the ring-shaped permanent magnets are arrayed in the axial direction, the damper is large in size. In the eddy current damper of Patent Literature 3, since the guide nut is provided outside the drum, it is likely that dust enters between the guide nut and the ball screw. In the eddy current damper disclosed in Patent Literature 3, the guide nut is provided outside the drum, a flange portion of the guide nut is fixed to the drum, and the cylindrical portion of the guide nut extends toward the opposite side of the drum. Therefore, it is necessary to ensure a long distance (stroke distance of the ball screw) between the end on the opposite side of the drum of the cylindrical portion of the guide nut and a fixture fixed to the building so that the size of the eddy current damper tends to increase. Furthermore, Patent Literature 3 does not particularly mention a technique for managing the gap between the drum inner peripheral surface and the permanent magnet.

An object of the present invention is to provide an eddy current damper, the size of which can be reduced.

Solution to Problem

An eddy current damper of this embodiment includes: a screw shaft movable in an axial direction; a plurality of first permanent magnets arrayed along a circumferential direction around the screw shaft; a plurality of second permanent magnets each arranged between the first permanent magnets leaving gaps with the first permanent magnets, wherein arrangement of magnetic poles is inverted between the second permanent magnet and the first permanent magnet; a cylindrical magnet holding member for holding the first permanent magnets and the second permanent magnets; a cylindrical conductive member, which has conductivity and is opposed to the first permanent magnets and the second permanent magnets with a gap therebetween; and a ball nut which is arranged inside the magnet holding member and the conductive member and fixed to the magnet holding member or the conductive member, and meshes with the screw shaft.

Advantageous Effects of Invention

According to the eddy current damper of the present embodiment, it is possible to realize down-sizing.

Figure 1:
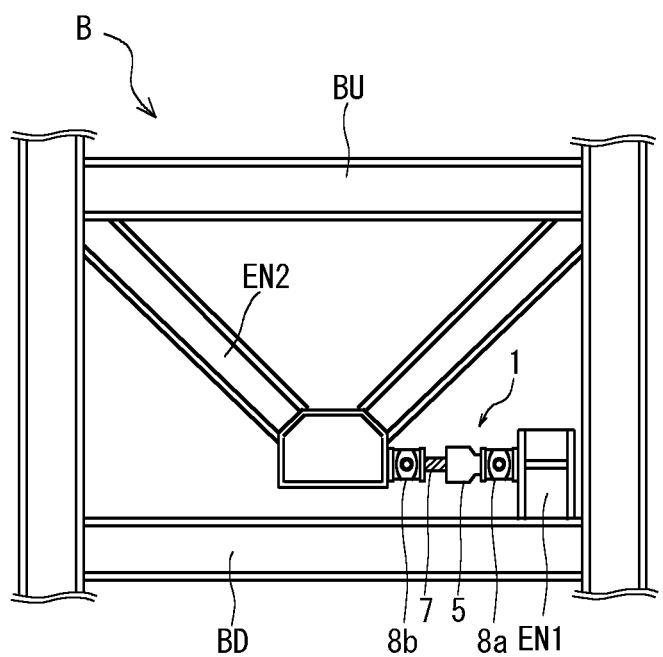
FIG. 1 is a schematic view of an eddy current damper applied to an interior of a building.

DESCRIPTION OF EMBODIMENTS (1) The eddy current damper of the present embodiment includes a screw shaft movable in an axial direction, a plurality of first permanent magnets, a plurality of second permanent magnets, a cylindrical magnet holding member, a cylindrical conductive member having conductivity, and a ball nut which meshes with the screw shaft. The first permanent magnets are arrayed along the circumferential direction around the screw shaft. The second permanent magnets are each arranged between the first permanent magnets leaving gaps with the first permanent magnets, and arrangement of magnetic poles is inverted between the second permanent magnet and the first permanent magnet. The magnet holding member holds the first permanent magnets and the second permanent magnets. The conductive member is opposed to the first permanent magnets and the second permanent magnets with a gap therebetween. The ball nut is arranged inside the magnet holding member and the conductive member, and is fixed to the magnet holding member or the conductive member.

According to the eddy current damper of the present embodiment, the ball nut is arranged inside the conductive member and the magnet holding member. Even if kinetic energy is given to the eddy current damper through vibration or others, and the screw shaft is moved in the axial direction, the ball nut does not move in the axial direction. Therefore, it is not necessary to provide a movable range of ball nut in the eddy current damper. Therefore, components such as the magnet holding member and the conductive member can be reduced in size. This makes it possible to realize downsizing of the eddy current damper. In addition, it is possible to realize weight reduction of the eddy current damper. Moreover, since each component has a simple configuration, assembly of the eddy current damper is facilitated. Furthermore, the component cost and manufacturing cost of the eddy current damper are reduced.

(2) In the eddy current damper of the above item (1), the magnet holding member may be arranged inside the conductive member. In this case, the first permanent magnets and the second permanent magnets are attached to an outer peripheral surface of the magnet holding member, and the ball nut is fixed to the magnet holding member.

According to the eddy current damper of the above item (2), the inner peripheral surface of the conductive member is opposed to the first permanent magnets and the second permanent magnets with a gap therebetween. The ball nut and the magnet holding member are rotated by the axial movement of the screw shaft. On the other hand, the conductive member is not rotatable. In this way, a magnetic flux which passes the conductive member from a first permanent magnet and a second permanent magnet changes, and an eddy current is generated in the inner peripheral surface of the conductive member. This eddy current generates a demagnetizing field, and a reaction force (braking force) is applied to the rotating magnet holding member. As a result, the screw shaft is subjected to a damping force.

Further, according to the eddy current damper of the above item (2), the conductive member is arranged outside the magnet holding member and is in contact with the outside air. In this way, the conductive member is cooled by the outside air. As a result, the temperature rise of the conductive member can be suppressed.

(3) The eddy current damper of the above item (2) may further include: a distal end side bearing attached to the inner peripheral surface of the conductive member at a position closer to the distal end side of the screw shaft than the first permanent magnets and the second permanent magnets, the distal end side bearing supporting the outer peripheral surface of the magnet holding member; and a root side bearing attached to the inner peripheral surface of the conductive member at a position closer to the root side of the screw shaft than the first permanent magnets and the second permanent magnets, the root side bearing supporting the outer peripheral surface of the magnet holding member.

According to the eddy current damper of the above item (3), the two bearings attached to the conductive member support the magnet holding member at two points with the permanent magnets being interposed therebetween. Therefore, even if the magnet holding member and the conductive member are rotated relatively, it is likely that a constant gap is maintained between the permanent magnets and the inner peripheral surface of the conductive member.

(4) In the eddy current damper of the above item (1), the conductive member may be arranged inside the magnet holding member. In this case, the first permanent magnets and the second permanent magnets are attached to the inner peripheral surface of the magnet holding member, and the ball nut is fixed to the conductive member.

According to the eddy current damper of the above item (4), the outer peripheral surface of the conductive member is opposed to the first permanent magnets and the second permanent magnets with a gap therebetween. The ball nut and the conductive member are rotated by the axial movement of the screw shaft. On the other hand, the magnet holding member is not rotatable. This causes changes in the magnetic fluxes which pass through the conductive member from first permanent magnets and second permanent magnets, and thereby eddy currents are generated in the outer peripheral surface of the conductive member. These eddy currents generate demagnetizing fields and a reaction force is applied to the rotating conductive member. As a result, the screw shaft is subjected to a damping force.

Further, according to the eddy current damper of the above item (4), the magnet holding member is arranged outside the conductive member and is in contact with the outside air. In this way, the magnet holding member is cooled by the outside air. As a result, the temperature rises of the first permanent magnets and the second permanent magnets can be suppressed.

(5) The eddy current damper of the above item (4) may further includes: a distal end side bearing attached to the inner peripheral surface of the magnet holding member at a position closer to the distal end side of the screw shaft than the first permanent magnets and the second permanent magnets, the distal end side bearing supporting the outer peripheral surface of the conductive member; and a root side bearing attached to the inner peripheral surface of the magnet holding member at a position closer to the root side of the screw shaft than the first permanent magnets and the second permanent magnets, the root side bearing supporting the outer peripheral surface of the conductive member.

According to the eddy current damper of the above item (5), the two bearings attached to the magnet holding member support the conductive member at two points with the permanent magnets being interposed therebetween. Therefore, even if the magnet holding member and the conductive member are rotated relatively, it is likely that a constant gap between the permanent magnets and the inner peripheral surface of the conductive member is maintained.

(6) In the eddy current damper of the above item (1), the magnet holding member may be arranged inside the conductive member. In this case, the first permanent magnets and the second permanent magnets are attached to the outer peripheral surface of the magnet holding member, and the ball nut is fixed to the conductive member.

According to the eddy current damper of the above item (6), the inner peripheral surface of the conductive member is opposed to the first permanent magnets and the second permanent magnets with a gap therebetween. The ball nut and the conductive member are rotated by the axial movement of the screw shaft. On the other hand, the magnet holding member is not rotatable. In this way, magnetic fluxes which pass through the conductive member from first permanent magnets and second permanent magnets change, and eddy currents are generated in the inner peripheral surface of the conductive member. These eddy currents generate demagnetizing fields and a reaction force is applied to the rotating conductive member. As a result, the screw shaft is subjected to a damping force.

Further, according to the eddy current damper of the above item (6), the conductive member is arranged outside the magnet holding member and is in contact with the outside air. In this way, the rotating conductive member is efficiently cooled by the outside air. As a result, the temperature rise of the conductive member can be suppressed.

(7) In the eddy current damper of the above item (1), the conductive member may be arranged inside the magnet holding member. In this case, the first permanent magnets and the second permanent magnets are attached to the inner peripheral surface of the magnet holding member, and the ball nut is fixed to the magnet holding member.

According to the eddy current damper of the above item (7), the outer peripheral surface of the conductive member is opposed to the first permanent magnets and the second permanent magnets with a gap therebetween. The ball nut and the magnet holding member are rotated by the axial movement of the screw shaft. On the other hand, the conductive member is not rotatable. In this way, magnetic fluxes which pass through the conductive member from first permanent magnets and second permanent magnets change, and eddy currents are generated in the outer peripheral surface of the conductive member. These eddy currents generate demagnetizing fields, and a reaction force is applied to the rotating magnet holding member. As a result, the screw shaft is subjected to a damping force.

Further, according to the eddy current damper of the above item (7), the magnet holding member is arranged outside the conductive member and is in contact with the outside air. In this way, the rotating magnet holding member is efficiently cooled by the outside air. As a result, temperature rises of the first permanent magnets and the second permanent magnets can be suppressed.

(8) In the eddy current damper of the above item (1), the first permanent magnets may be arranged in a plurality of rows along the axial direction of the magnet holding member. In this case, the second permanent magnets are arranged in a plurality of rows along the axial direction of the magnet holding member.

According to the eddy current damper of the above item (8), even if the size of each of the first permanent magnets and the second permanent magnets is small, the total size of the plurality of first permanent magnets and the second permanent magnets is large. Therefore, the cost of the first permanent magnets and the second permanent magnets can be kept low while keeping high damping force of the eddy current damper. Moreover, it is easy to attach the first permanent magnets and the second permanent magnets to the magnet holding member.

Hereinafter, an eddy current damper of the present embodiment will be described with reference to the drawings.

FIG. 1 is a schematic view of an eddy current damper applied in a building. In FIG. 1, an eddy current damper of a first embodiment and a part of the building are shown as an example. The eddy current damper 1 is applied to, for example, a high-rise building B for residential use or commercial use. A fixture 8*a* which is integral with a conductive member 5 is connected to a lower beam BD of the building B via a first connecting member EN1. A fixture 8*b* which is integral with a screw shaft 7 is connected to the upper beam BU of the building B via a second connecting member EN2. In this case, the fixture 8*a* is attached to the first connecting member EN1 slightly extending upward from the lower beam BD, and the fixture 8*b* is attached to the V-brace shaped second connecting member EN2 extending from the upper beam BU. The eddy current damper 1 extends horizontally between the lower beam BD and the upper beam BU. The first connecting member EN1 and the second connecting member EN2 are made of a material having high rigidity, such as steel.

Note that the method of connecting the eddy current damper 1 to the building B is arbitrary, and of course, other appropriate methods (including regions of the building B to be connected) may be adopted.

First Embodiment

Figure 2:
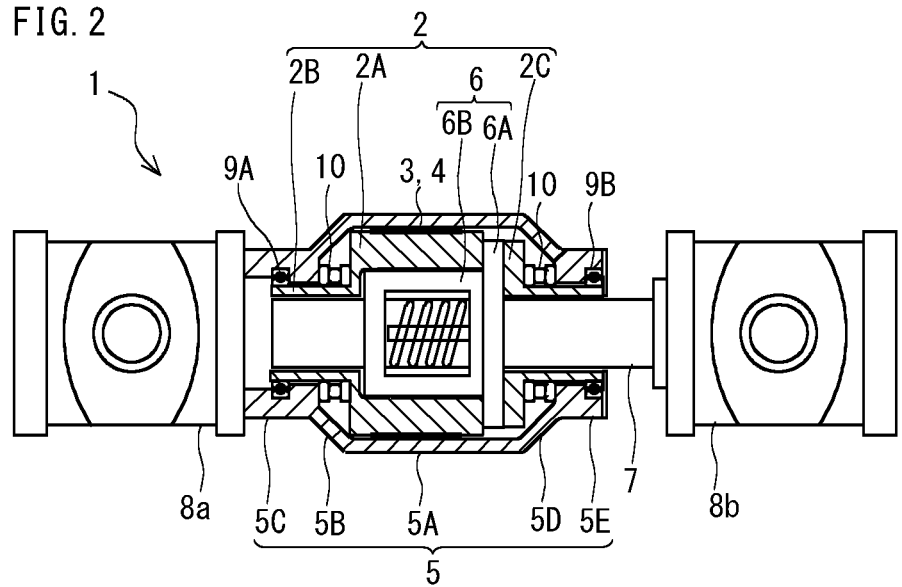
FIG. 2 is a sectional view taken in a plane along an axial direction of the eddy current damper.
Figure 3:
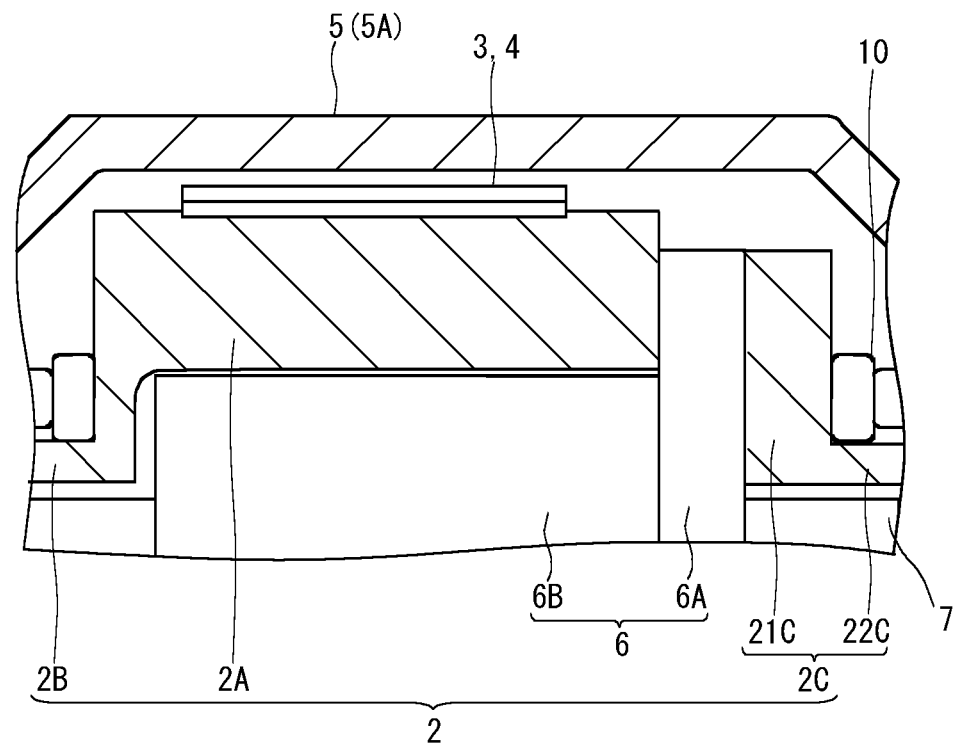
FIG. 3 is a partially enlarged view of FIG. 2.

FIG. 2 is a cross-sectional view of the eddy current damper taken in a plane along the axial direction of the eddy current damper. FIG. 3 is a partially enlarged view of FIG. 2. Referring to FIGS. 2 and 3, an eddy current damper 1 includes a magnet holding member 2, a plurality of first permanent magnets 3, a plurality of second permanent magnets 4, a conductive member 5, a ball nut 6, and a screw shaft 7.

[Magnet Holding Member]

The magnet holding member 2 includes a main cylinder 2A, a distal end side sub-cylinder 2B, and a root side sub-cylinder 2C.

The main cylinder 2A has a cylindrical shape with the screw shaft 7 as a central axis. The length of the main cylinder 2A in the axial direction of the screw shaft 7 is larger than the lengths of the first permanent magnet 3 and the second permanent magnet 4 in the axial direction of the screw shaft 7.

The distal end side sub-cylinder 2B extends from the end on the distal end side (the free end side of the screw shaft 7 or the fixture 8a side) of the main cylinder 2A. The distal end side sub-cylinder 2B has a cylindrical shape with the screw shaft 7 as its central axis. The outer diameter of the distal end side sub-cylinder 2B is smaller than the outer diameter of the main cylinder 2A.

Referring to FIG. 3, the root side sub-cylinder 2C is provided on the root side (the fixture 8b side) of the main cylinder 2A with a flange portion 6A of a ball nut being interposed therebetween. The root side sub-cylinder 2C includes a flange fixing portion 21C and a cylindrical support portion 22C. The flange fixing portion 21C has a cylindrical shape with the screw shaft 7 as its central axis, and is fixed to the flange portion 6A of the ball nut. The cylindrical support portion 22C extends from the end of the root side (the fixture 8b side) of the flange fixing portion 21C, and has a cylindrical shape. The outer diameter of the cylindrical support portion is smaller than the outer diameter of the flange fixing portion 21C.

The magnet holding member 2 having such a configuration can accommodate the cylindrical portion 6B of the ball nut and a part of the screw shaft 7 thereinside. The material of the magnet holding member 2 is not particularly limited. However, the material of the magnet holding member 2 is preferably one having a high magnetic permeability, such as steel. The material of the magnet holding member 2 is, for example, a ferromagnetic substance such as carbon steel or cast iron. In this case, the magnet holding member 2 serves as a yoke. In other words, magnetic fluxes from the first permanent magnets 3 and the second permanent magnets 4 are less likely to leak to the outside, and the damping force of the eddy current damper 1 is increased. As will be described later, the magnet holding member 2 is rotatable with respect to the conductive member 5.

[First Permanent Magnet and Second Permanent Magnet]

Figure 4:
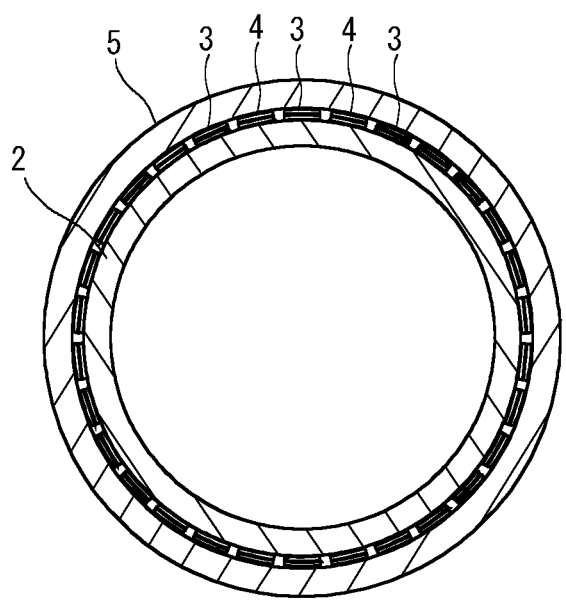
FIG. 4 is a sectional view taken in a plane perpendicular to the axial direction of the eddy current damper.
Figure 5:
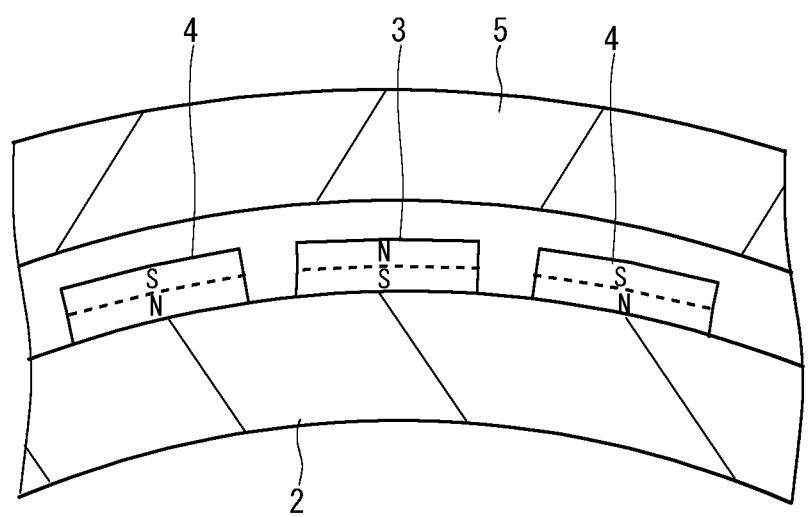
FIG. 5 is a partially enlarged view of FIG. 4.
Figure 6:
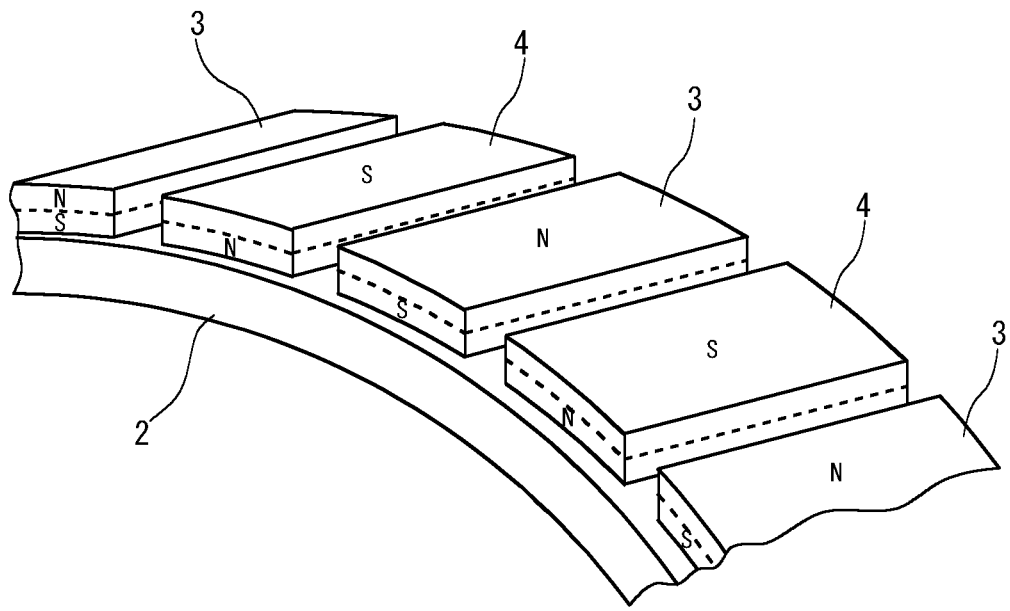
FIG. 6 is a perspective view showing first permanent magnets and second permanent magnets.

FIG. 4 is a sectional view taken in a plane perpendicular to the axial direction of an eddy current damper. FIG. 5 is a partially enlarged view of FIG. 4. FIG. 6 is a perspective view showing first permanent magnets and second permanent magnets. In FIG. 4 to FIG. 6, some components such as a screw shaft are omitted. Referring to FIG. 4 to FIG. 6, a plurality of first permanent magnets 3 and a plurality of second permanent magnets 4 are attached to an outer peripheral surface of the magnet holding member 2 (main cylinder 2A). The first permanent magnets 3 are arrayed around the screw shaft (that is, along the circumferential direction of the magnet holding member 2). Similarly, the second permanent magnets 4 are arrayed around the screw shaft (that is, along the circumferential direction of the magnet holding member 2). Second permanent magnets 4 are arranged between the first permanent magnets 3 leaving gaps therebetween. In other words, the first permanent magnets 3 and the second permanent magnets 4 are alternately arranged leaving gaps therebetween along the circumferential direction of the magnet holding member 2.

The magnetic poles of the first permanent magnet 3 and the second permanent magnet 4 are arranged in the radial direction of the magnet holding member 2. The arrangement of the magnetic poles of the second permanent magnet 4 is inverted from the arrangement of the magnetic poles of the first permanent magnet 3. For example, referring to FIGS. 5 and 6, the N poles of first permanent magnets 3 are arranged on the outer side, and the S poles thereof are arranged on the inner side, in the radial direction of the magnet holding member 2. Therefore, the S poles of the first permanent magnets 3 are in contact with the magnet holding member 2. On the other hand, in the radial direction of the magnet holding member 2, the N poles of the second permanent magnets 4 are arranged on the inner side, and the S poles thereof are arranged on the outer side. Therefore, the N poles of the second permanent magnets 4 are in contact with the magnet holding member 2.

The size and characteristics of the second permanent magnet 4 are preferably the same as the size and characteristics of the first permanent magnet 3. The first permanent magnets 3 and the second permanent magnets 4 are fixed to the magnet holding member 2 with an adhesive, for example. Of course, the first permanent magnets 3 and the second permanent magnets 4 may be fixed with bolts or the like, without being limited to the adhesive.

[Conductive Member]

Referring to FIGS. 2 and 3, the conductive member 5 includes a central cylindrical portion 5A, a distal end side conical portion 5B, a distal end side cylindrical portion 5C, a root side conical portion 5D, and a root side cylindrical portion 5E.

The central cylindrical portion 5A has a cylindrical shape with the screw shaft 7 as its central axis. The inner peripheral surface of the central cylindrical portion 5A is opposed to the first permanent magnets 3 and the second permanent magnets 4 with a gap therebetween. The distance between the inner peripheral surface of the central cylindrical portion 5A and the first permanent magnets 3 (or the second permanent magnets 4) is constant along the axial direction of the screw shaft 7. The length of the central cylindrical portion 5A in the axial direction of the screw shaft 7 is larger than the lengths of the first permanent magnet 3 and the second permanent magnet 4 in the axial direction of the screw shaft 7.

The distal end side conical portion 5B has a conical shape with the screw shaft 7 as its central axis. The distal end side conical portion 5B extends from the end on the distal end side (the free end side of the screw shaft 7 or the fixture 8a side) of the central cylindrical portion 5A, and the outer diameter and inner diameter of the distal end side conical portion 5B become smaller as being closer to the distal end side (the free end side of the screw shaft 7 or the fixture 8a side).

The distal end side cylindrical portion 5C has a cylindrical shape with the screw shaft 7 as its central axis. The distal end side cylindrical portion 5C extends from the end of the distal end side (the free end side of the screw shaft 7 or the fixture 8a side) of the distal end side conical portion 5B. The end on the distal end side of the distal end side cylindrical portion 5C (the free end side of the screw shaft 7 or the fixture 8a side) is fixed to the fixture 8a.

The root side conical portion 5D has a conical shape with the screw shaft 7 as its central axis. The root side conical portion 5D extends from the end on the root side (the fixture 8b side) of the central cylindrical portion 5A, and the outer diameter and inner diameter of the root side conical portion 5D become smaller as moving toward the root side (the fixture 8b side).

The root side cylindrical portion 5E has a cylindrical shape with the screw shaft 7 as its central axis. The root side cylindrical portion 5E extends from the end on the root side (the fixture 8b side) of the root side conical portion 5D. The end on the root side (the fixture 8b side) of the root side cylindrical portion 5E is a free end.

The conductive member 5 having such a configuration can accommodate the magnet holding member 2, the first permanent magnets 3, the second permanent magnets 4, the ball nut 6, and a part of the screw shaft 7. The magnet holding member 2 is arranged in a concentric fashion inside the conductive member 5. As will be described later, in order to generate an eddy current in the inner peripheral surface of the conductive member 5 (the inner peripheral surface of the central cylindrical portion 5A), the conductive member 5 is rotated relative to the magnet holding member 2. Therefore, a gap is provided between the conductive member 5, and the first permanent magnets 3 and the second permanent magnets 4. The fixture 8a integral with the conductive member 5 is fixed to a building support surface, or within the building. Therefore, the conductive member 5 is not rotatable around the screw shaft 7.

The conductive member 5 has conductivity. The material of the conductive member 5 is, for example, a ferromagnetic substance such as carbon steel or cast iron. In addition, the material of the conductive member 5 may be a feeble magnetic substance such as ferritic stainless steel or a nonmagnetic substance such as aluminum alloy, austenitic stainless steel, and a copper alloy.

The conductive member 5 rotatably supports the magnet holding member 2. The supporting of the magnet holding member 2 is preferably configured, for example, as follows.

Referring to FIG. 2, the eddy current damper 1 further includes a distal end side bearing 9A and a root side bearing 9B. The distal end side bearing 9A is attached to the inner peripheral surface of the conductive member 5 (distal end side cylindrical portion 5C) at a position closer to the distal end side of the screw shaft 7 (the free end side of the screw shaft 7 or the fixture 8a side) than the first permanent magnets 3 and the second permanent magnets 4, to support the outer peripheral surface of the magnet holding member 2 (the distal end side sub-cylinder 2B). Further, the root side bearing 9B is attached to the inner peripheral surface of the conductive member 5 (the root side cylindrical portion 5E) at a position closer to the root side of the screw shaft 7 than the first permanent magnets 3 and the second permanent magnets 4, thereby supporting the outer peripheral surface of the magnet holding member 2 (the cylindrical support portion 22C).

With such a configuration, the magnet holding member 2 is supported on both sides of the first permanent magnets 3 and the second permanent magnets 4 in the axial direction of the screw shaft 7. Therefore, even if the magnet holding member 2 is rotated, the gap between the first permanent magnets 3 (second permanent magnet 4) and the conductive member 5 is likely to be kept at a constant distance. If the gap is kept at a constant distance, the braking force due to an eddy current can be stably obtained. Further, if the gap is kept at a constant distance, there is less possibility that the first permanent magnets 3 and the second permanent magnets 4 come into contact with the conductive member 5, and therefore the gap can be further reduced. In that way, as will be described later, the amount of magnetic fluxes from the first permanent magnets 3 and the second permanent magnets 4 passing through the conductive member 5 increases, thus allowing the braking force to further increase, or allowing desired braking force to be exerted even if the number of the permanent magnets is decreased.

A thrust bearing 10 is provided between the magnet holding member 2 and the conductive member 5 in the axial direction of the magnet holding member 2. Note that, of course, the types of the distal end side bearing 9A, the root side bearing 9B, and the thrust bearing 10 are not particularly limited, and may be a ball type, a roller type, a sliding type, or the like.

Note that the central cylindrical portion 5A, the distal end side conical portion 5B, the distal end side cylindrical portion 5C, the root side conical portion 5D, and the root side cylindrical portion 5E are respectively separate members, and are connected and assembled with bolts or the like.

[Ball Nut]

The ball nut 6 includes a flange portion 6A and a cylindrical portion 6B. The flange portion 6A has a cylindrical shape. The flange portion 6A is provided between the end on the root side (the fixture 8b side) of the main cylinder 2A of the magnet holding member and the end on the distal end side (the fixture 8a side) of the flange fixing portion 21C of the root side sub-cylinder 2C, and is fixed to both of them. The cylindrical portion 6B is provided closer to the distal end side of the screw shaft 7 than the flange portion 6A, and extends from the surface on the distal end side of the flange portion 6A.

The ball nut 6 having such a configuration is arranged inside the magnet holding member 2 and the conductive member 5. Since the ball nut 6 is fixed to the magnet holding member 2, when the ball nut 6 is rotated, the magnet holding member 2 also rotates. The type of the ball nut 6 is not particularly limited. As the ball nut 6, a known ball nut may be used. A threaded portion is formed on the inner peripheral surface of the ball nut 6. Note that, in FIG. 2, rendering of a part of the cylindrical portion 6B of the ball nut 6 is omitted so that the screw shaft 7 can be seen.

[Screw Shaft]

The screw shaft 7 penetrates the ball nut 6 and meshes with the ball nut 6 via a ball. A threaded portion corresponding to the threaded portion of the ball nut 6 is formed on the outer peripheral surface of the screw shaft 7. The screw shaft 7 and the ball nut 6 constitute a ball screw. The ball screw converts the axial movement of the screw shaft 7 into the rotational movement of the ball nut 6. A fixture 8b is connected to the screw shaft 7. The fixture 8b integral with the screw shaft 7 is fixed to a building support surface or within the building. In the case where the eddy current damper 1 is installed, for example, in a seismic isolation layer lying between within the building and the building support surface, a fixture 8b integral with the screw shaft 7 is fixed within the building, and the fixture 8a integral with the conductive member 5 is fixed to the building support surface. In the case where the eddy current damper 1 is installed, for example, between arbitrary layers within a building, the fixture 8*b* integral with the screw shaft 7 is fixed to the upper beam side between the arbitrary layers, and the fixture 8*a* integral with the conductive member 5 is fixed to the lower beam side between arbitrary layers. Therefore, the screw shaft 7 is not rotatable around the axis.

Fixing of the fixture 8*b* integral with the screw shaft 7 and the fixture 8*a* integral with the conductive member 5 may be reversed from the aforementioned description. In other words, the fixture 8*b* integral with the screw shaft 7 may be fixed to the building support surface, and the fixture 8*a* integral with the conductive member 5 may be fixed within the building.

The screw shaft 7 can move back and forth along the axial direction inside the magnet holding member 2 and the conductive member 5. Accordingly, when kinetic energy is applied to the eddy current damper 1 due to vibration or the like, the screw shaft 7 moves in the axial direction. If the screw shaft 7 moves in the axial direction, the ball nut 6 rotates around the screw shaft by the action of ball screw. As the ball nut 6 rotates, the magnet holding member 2 is rotated. As a result, since the first permanent magnets 3 and the second permanent magnets 4, which are integral with the magnet holding member 2, rotate relative to the conductive member 5, an eddy current is generated in the conductive member 5. As a result, a damping force is generated in the eddy current damper 1, thereby damping vibration.

According to the eddy current damper 1 of the present embodiment, the ball nut 6 is arranged inside the conductive member 5 and the magnet holding member 2. Even if kinetic energy is applied to the eddy current damper 1 due to vibration or the like, and the screw shaft 7 integral with the fixture 8*b* moves in the axial direction, the ball nut 6 does not move in the axial direction. Therefore, it is not necessary to provide a movable range of the ball nut 6 in the eddy current damper 1. For that reason, it is possible to reduce the sizes of components such as the magnet holding member 2 and the conductive member 5. In this way, the eddy current damper 1 can be reduced in size, and thus weight reduction of the eddy current damper 1 can be realized.

Further, since the ball nut 6 is arranged inside the conductive member 5 and the magnet holding member 2, dust becomes less likely to enter between the ball nut 6 and the screw shaft 7, and the screw shaft 7 can be smoothly moved over a long period of time. Further, arranging the ball nut 6 inside the conductive member 5 and the magnet holding member 2 allows reduction of a distance between the end on the distal end side (the fixture 8*a* side) of the fixture 8*b* and the end on the root side (the fixture 8*b* side) of the conductive member 5, thus allowing downsizing of the eddy current damper. In addition, since each component has a simple configuration, the eddy current damper 1 can be easily assembled. Moreover, the component cost and manufacturing cost of the eddy current damper 1 are reduced.

The conductive member 5 accommodates the first permanent magnets 3 and the second permanent magnets 4 thereinside. In other words, the length of the conductive member 5 in the axial direction of the screw shaft 7 is larger than the length of the first permanent magnets 3 (the second permanent magnets 4) in the axial direction of the screw shaft 7, and thus the volume of the conductive member 5 is large. When the volume of the conductive member 5 increases, the heat capacity of the conductive member 5 also increases. Therefore, the temperature rise of the conductive member 5 due to generation of eddy current is suppressed. When the temperature rise of the conductive member 5 is suppressed, the temperature rises of the first permanent magnets 3 and the second permanent magnets 4 due to radiant heat from the conductive member 5 will be suppressed, and demagnetization due to temperature rises of the first permanent magnets 3 and the second permanent magnets 4 will be suppressed.

Next, principles of generation of eddy current, and principles of generation of damping force due to eddy current will be described.

[Damping Force Due to Eddy Current]

Figure 7:
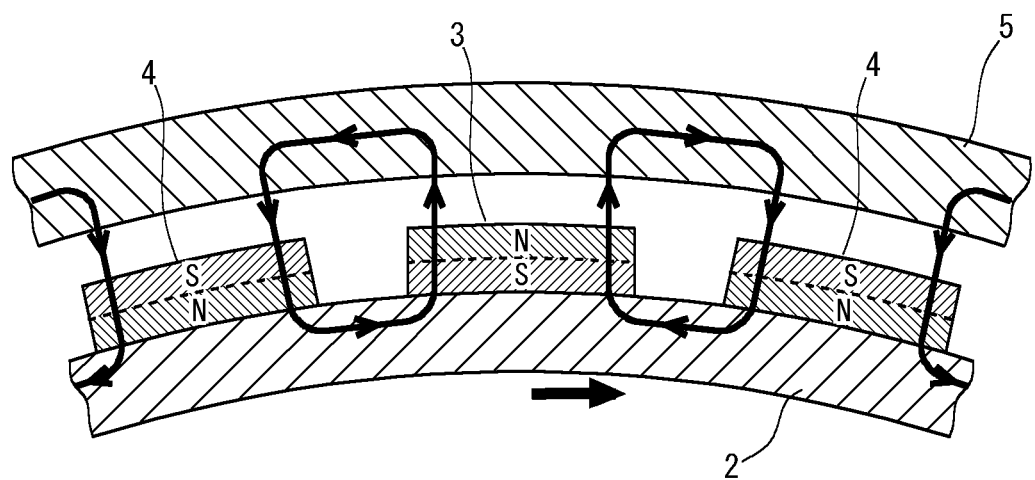
FIG. 7 is a schematic diagram showing magnetic circuits of an eddy current damper.

FIG. 7 is a schematic diagram showing magnetic circuits of an eddy current damper. Referring to FIG. 7, the arrangement of magnetic poles of a first permanent magnet 3 is inverted from the arrangement of magnetic poles of adjacent second permanent magnets 4. Therefore, magnetic fluxes emitted from the N pole of a first permanent magnet 3 reach the S poles of the adjacent second permanent magnets 4. Magnetic fluxes emitted from the N poles of a second permanent magnet reach S poles of the adjacent first permanent magnets 3. As a result, a magnetic circuit is formed within a first permanent magnet 3, a second permanent magnet 4, the conductive member 5, and the magnet holding member 2. Since the gap between the first permanent magnet 3 and the conductive member 5, or between the second permanent magnet 4 and the conductive member 5 is sufficiently small, the conductive member 5 is within a magnetic field.

When the magnet holding member 2 rotates (see the arrow in FIG. 7), the first permanent magnets 3 and the second permanent magnets 4 move with respect to the conductive member 5. Therefore, the magnetic fluxes passing through the surface of the conductive member 5 (in FIG. 7, the inner peripheral surface of the conductive member 5 opposed to the first permanent magnets 3 and the second permanent magnets 4) change. In this way, eddy currents are generated in the surface of the conductive member 5 (in FIG. 7, the inner peripheral surface of the conductive member 5). When an eddy current is generated, a new magnetic flux (demagnetizing field) is generated. This new magnetic flux hinders relative rotation between the magnet holding member 2 (the first permanent magnets 3 and the second permanent magnets 4) and the conductive member 5. In the case of the present embodiment, the rotation of the magnet holding member 2 is hindered. When the rotation of the magnet holding member 2 is hindered, the rotation of the ball nut 6 integral with the magnet holding member 2 is also hindered. When the rotation of the ball nut 6 is hindered, the axial movement of the screw shaft 7 is also hindered. This is the damping force of the eddy current damper 1. An eddy current generated by kinetic energy due to vibration or the like increases the temperature of the conductive member. In other words, kinetic energy applied to the eddy current damper is converted into thermal energy, and a damping force is obtained.

According to the eddy current damper of the present embodiment, the arrangement of the magnetic poles of a first permanent magnet is inverted from the arrangement of the magnetic poles of a second permanent magnet adjacent to the first permanent magnet in the circumferential direction of the magnet holding member. Therefore, a magnetic field due to the first permanent magnet and the second permanent magnet is generated in the circumferential direction of the magnet holding member. Further, by arraying first permanent magnets and second permanent magnets in a plural number in the circumferential direction of the magnet holding member, the amount of magnetic flux that reaches the conductive member is increased. In this way, the eddy current generated in the conductive member is increased, and the damping force of the eddy current damper is increased.

[Arrangement of Magnetic Poles]

In the above description, a case in which arrangement of the magnetic poles of the first permanent magnets and the second permanent magnets is in the radial direction of the magnet holding member has been described. However, the arrangement of the magnetic poles of the first permanent magnets and the second permanent magnets is not limited to this.

Figure 8:
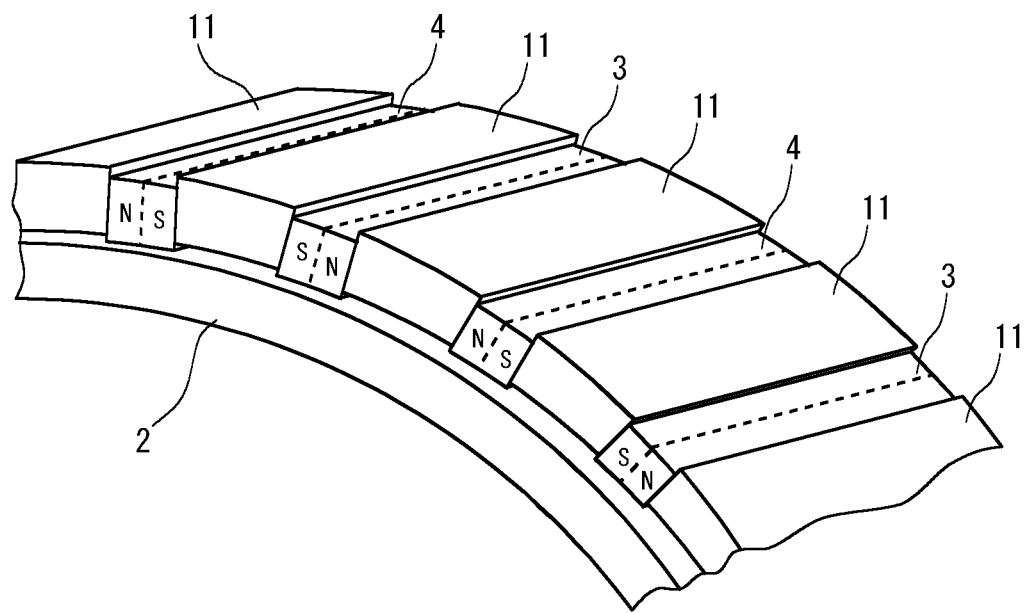
FIG. 8 is a perspective view showing first permanent magnets and second permanent magnets in which the magnetic poles are arranged in the circumferential direction.

FIG. 8 is a perspective view showing the first permanent magnets and the second permanent magnets, in which the magnetic poles are arranged in the circumferential direction. Referring to FIG. 8, arrangements of the magnetic poles of first permanent magnets 3 and second permanent magnets 4 are along the circumferential direction of the magnet holding member 2. Even in this case, the arrangement of the magnetic poles of a first permanent magnet 3 is inverted from the arrangement of the magnetic poles of a second permanent magnet 4. A ferromagnetic pole piece 11 is provided between a first permanent magnet 3 and a second permanent magnet 4.

Figure 9:
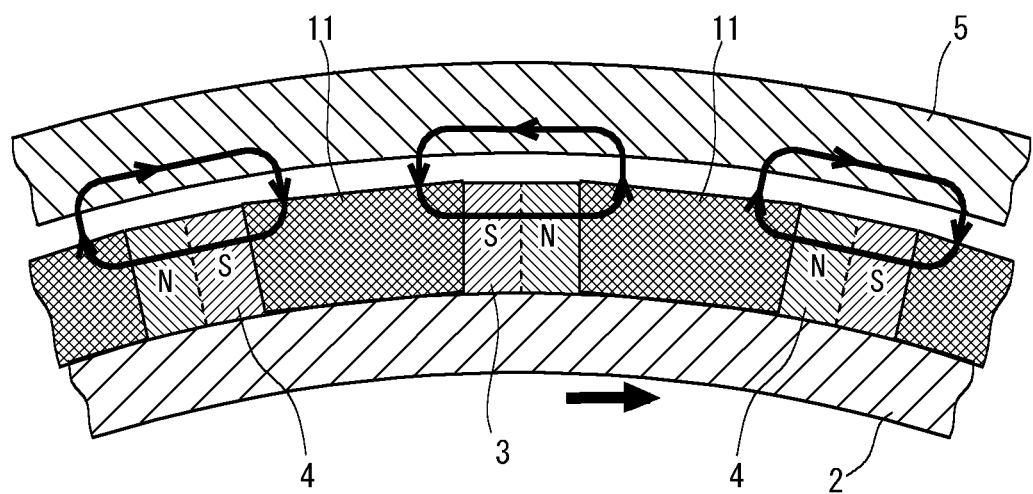
FIG. 9 is a schematic diagram showing magnetic circuits of the eddy current damper of FIG. 8.

FIG. 9 is a schematic diagram showing magnetic circuits of the eddy current damper of FIG. 8. Referring to FIG. 9, a magnetic flux emitted from an N pole of a first permanent magnet 3 passes through a pole piece 11 and reaches an S pole of the first permanent magnet 3. The same applies to the second permanent magnets 4. As a result, a magnetic circuit is formed within a first permanent magnet 3, a second permanent magnet 4, a pole piece 11, and the conductive member 5. In this way, a damping force is obtained in the eddy current damper 1 in the same as described above.

[Arrangement of Permanent Magnets in Axial Direction]

In order to increase the damping force of the eddy current damper 1, the eddy current generated in the conductive member may be increased. One way to generate a large eddy current is to increase the amount of magnetic flux emanating from a first permanent magnet and a second permanent magnet. In other words, the sizes of the first permanent magnet and the second permanent magnet may be increased. However, when the first permanent magnet and the second permanent magnet are large in size, they are high in cost and attaching them to the magnet holding member is not easy.

Figure 10:
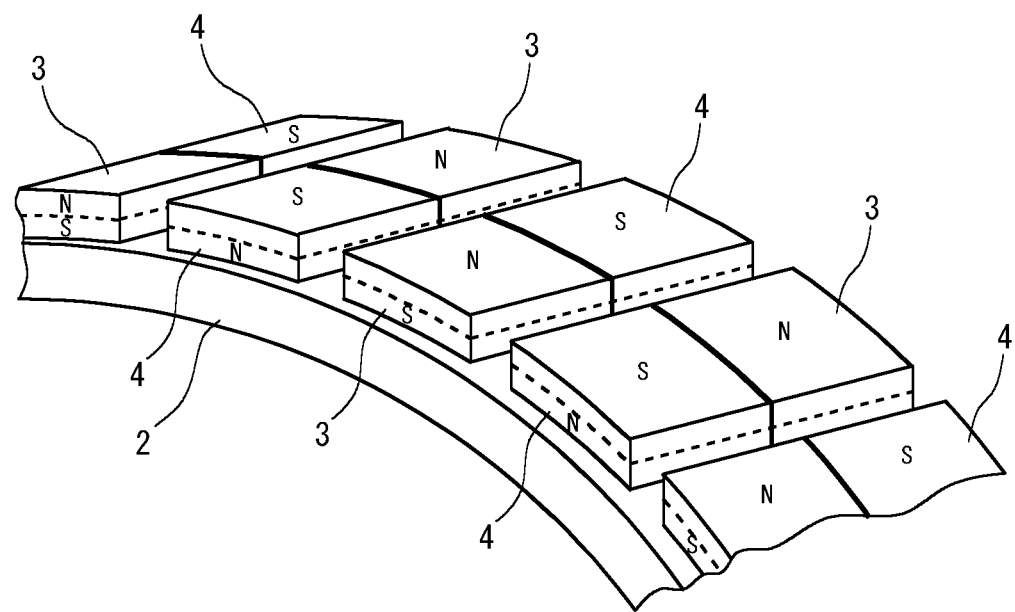
FIG. 10 is a perspective view showing first permanent magnets and second permanent magnets, which are arranged in a plurality of rows in the axial direction.

FIG. 10 is a perspective view showing first permanent magnets and second permanent magnets, which are arranged in a plurality of rows in the axial direction. Referring to FIG. 10, first permanent magnets 3 and second permanent magnets 4 may be arranged in a plurality of rows in the axial direction of one magnet holding member 2. In this way, each size of one first permanent magnet 3 and one second permanent magnet 4 may be small. On the other hand, the total size of the plurality of first permanent magnets 3 and second permanent magnets 4 which are attached to the magnet holding member 2 is large. Therefore, the costs of the first permanent magnet 3 and the second permanent magnet 4 can be kept low. Moreover, attaching the first permanent magnet 3 and the second permanent magnet 4 to the magnet holding member 2 is also easy.

Arrangement of the first permanent magnets 3 and the second permanent magnets 4, which are arranged in the axial direction, in the circumferential direction of the magnet holding member 2 is the same as described above. In other words, the first permanent magnets 3 and the second permanent magnets 4 are alternately arranged along the circumferential direction of the magnet holding member 2.

From the viewpoint of increasing the damping force of the eddy current damper 1, the first permanent magnet 3 is preferably adjacent to the second permanent magnet 4 in the axial direction of the magnet holding member 2. In this case, the magnetic circuit is generated not only in the circumferential direction of the magnet holding member 2 but also in the axial direction thereof. Therefore, the eddy current generated in the conductive member 5 is increased. As a result, the damping force of the eddy current damper 1 increases.

However, in the axial direction of the magnet holding member 2, the arrangement of the first permanent magnet 3 and the second permanent magnet 4 is not particularly limited. In other words, in the axial direction of the magnet holding member 2, a first permanent magnet 3 may be arranged next to a first permanent magnet 3 or may be arranged next to a second permanent magnet 4.

In the first embodiment described above, description has been made on a case in which the magnet holding member is arranged inside the conductive member; the first permanent magnets and the second permanent magnets are attached to the outer peripheral surface of the magnet holding member; and further the magnet holding member is rotatable. However, the eddy current damper of the present embodiment will not be limited to this.

Second Embodiment

In an eddy current damper according to a second embodiment, a magnet holding member is arranged outside a conductive member and is not rotatable. Eddy currents are generated as a result of rotation of the inner conductive member. Note that, in the eddy current damper of the second embodiment, the arrangement relationship between the magnet holding member and the conductive member is reversed from that of the first embodiment. However, the shape of the magnet holding member of the second embodiment is the same as that of the conductive member of the first embodiment, and the shape of the conductive member of the second embodiment is the same as that of the magnet holding member of the first embodiment. Therefore, in the second embodiment, detailed description on the shapes of the magnet holding member and the conductive member will be omitted.

Figure 11:
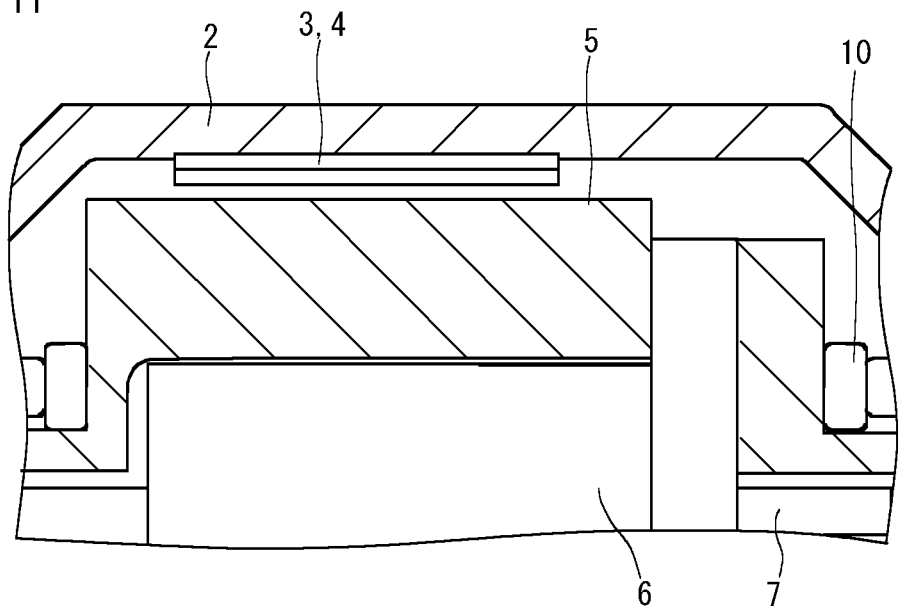
FIG. 11 is a sectional view taken in a plane along the axial direction of an eddy current damper of a second embodiment.
Figure 12:
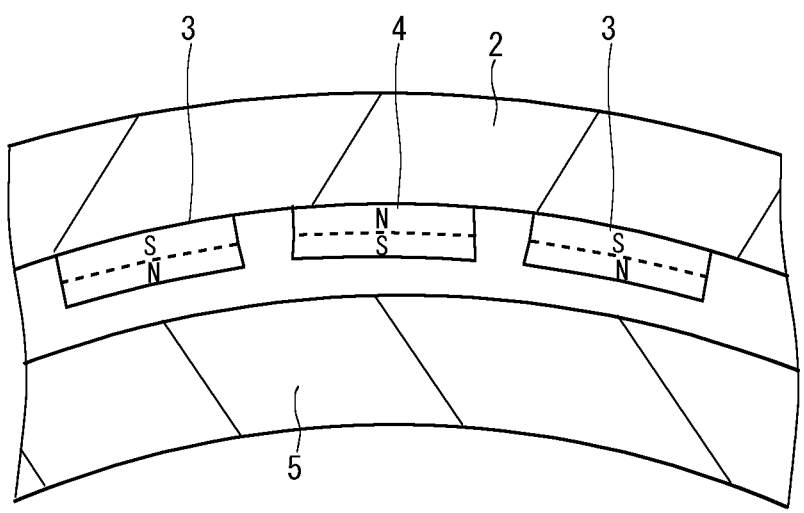
FIG. 12 is a sectional view taken in a plane perpendicular to the axial direction of the eddy current damper of the second embodiment.

FIG. 11 is a sectional view taken in a plane along the axial direction of the eddy current damper according to the second embodiment. FIG. 12 is a sectional view taken in a plane perpendicular to the axial direction of the eddy current damper according to the second embodiment. With reference to FIGS. 11 and 12, the magnet holding member 2 can accommodate a conductive member 5, a ball nut 6, and a screw shaft 7. The first permanent magnets 3 and the second permanent magnets 4 are attached to the inner peripheral surface of the magnet holding member 2. Therefore, the outer peripheral surface of the conductive member 5 is opposed to the first permanent magnets 3 and the second permanent magnets 4 with a gap therebetween.

The fixture 8a shown in FIG. 2 is connected to the magnet holding member 2. Therefore, the magnet holding member 2 is not rotatable around the screw shaft 7. On the other hand, the ball nut 6 is connected to the conductive member 5. Accordingly, when the ball nut 6 is rotated, the conductive member 5 rotates. Even in such a configuration, as described above, since the first permanent magnets 3 and the second permanent magnets 4, which are integral with the magnet holding member 2, are rotated relative to the conductive member 5, eddy currents are generated in the conductive member 5. As a result, a damping force is generated in the eddy current damper 1, enabling to dampen vibration.

Figure 13:
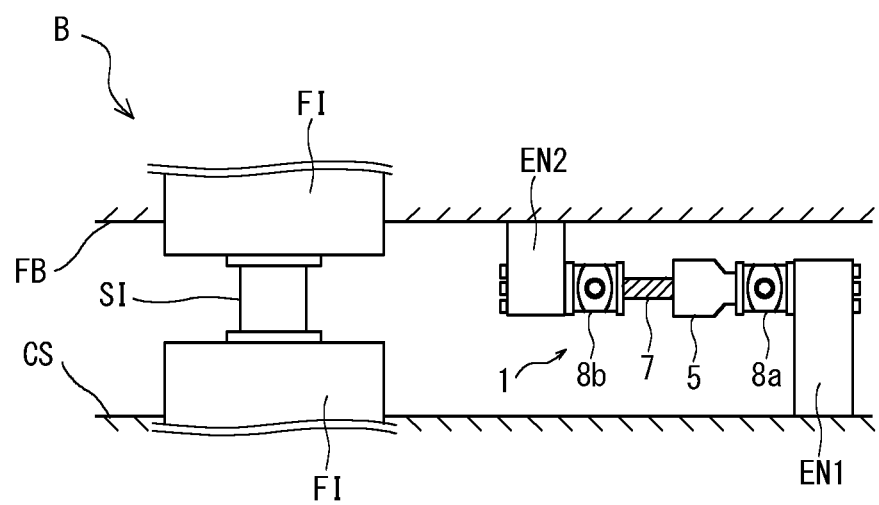
FIG. 13 is a schematic view of an eddy current damper applied in a building different from that of FIG. 1.

FIG. 13 is a schematic view of an eddy current damper applied in a building different from that of FIG. 1. FIG. 13 shows, as an example, an eddy current damper of a third embodiment and a part of the building. This building is, for example, a residential or commercial high-rise building erected on a foundation of the building. The foundation of this building has a seismic isolation structure. The foundation includes a foundation beam FB, a concrete slab CS, and two fixing portions FI. The foundation beam FB shown in FIG. 13 is one foundation beam (upper foundation) that is attached to the upper side among a plurality of foundation beams combined in a parallel cross shape. One fixing portion FI is attached to the foundation beam FB. Another fixing portion FI is attached to the concrete slab CS. A seismic isolation device SI is provided between the two fixing portions FI to connect the two fixing portions FI. The upper foundation (foundation beam FB) and the main body portion of the building B are supported by the concrete slab CS (lower foundation) via the seismic isolation device SI.

A fixture 8a integral with the conductive member 5 is connected to the lower foundation (concrete slab CS) of the building B via a first connecting member EN1. A fixture 8b integral with a screw shaft 7 is connected to the upper foundation (foundation beam FB) of the building B via a second connecting member EN2. In this case, the fixture 8a is attached to the first connecting member EN1 slightly extending upward from the lower foundation, and the fixture 8b is attached to the second connecting member EN2 slightly extending downward from the upper foundation. The eddy current damper 1 extends horizontally between the lower foundation and the upper foundation.

Third Embodiment

In an eddy current damper of a third embodiment, the magnet holding member is arranged inside the conductive member, and is not rotatable. An eddy current is generated as a result of rotation of the conductive member in the outside.

Figure 14:
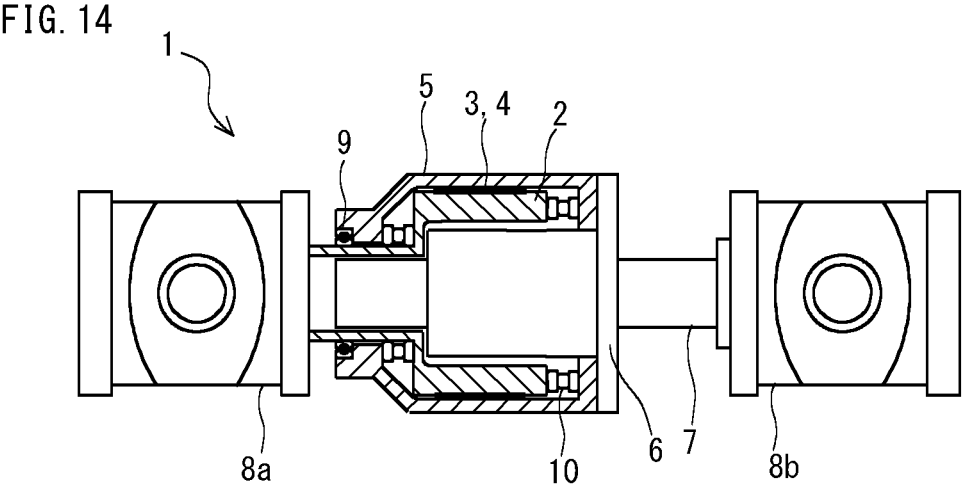
FIG. 14 is a sectional view taken in a plane along the axial direction of an eddy current damper of a third embodiment.
Figure 15:
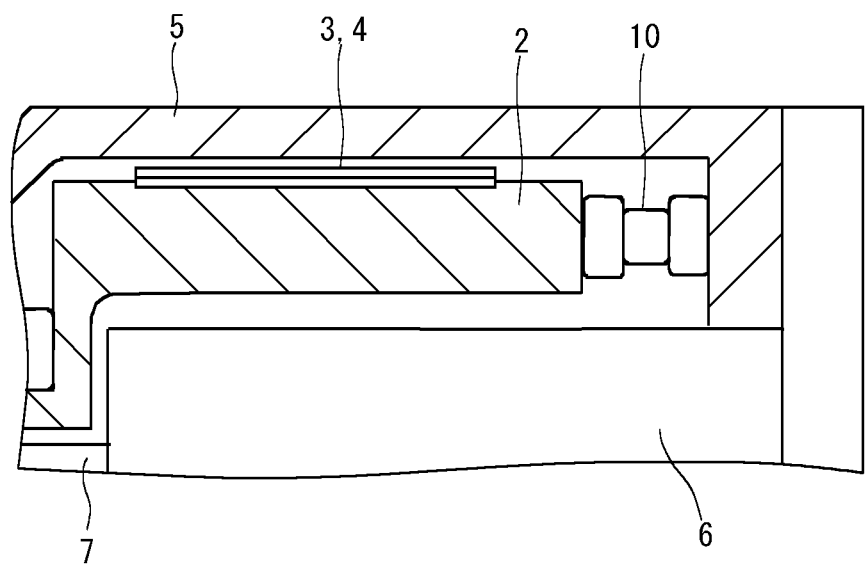
FIG. 15 is a partially enlarged view of FIG. 14.

FIG. 14 is a sectional view taken in a plane along the axial direction of an eddy current damper of a third embodiment. FIG. 15 is a partially enlarged view of FIG. 14. Referring to FIGS. 14 and 15, a conductive member 5 can accommodate a magnet holding member 2, a ball nut 6, and a screw shaft 7. The first permanent magnets 3 and the second permanent magnets 4 are attached to the outer peripheral surface of the magnet holding member 2. Therefore, the inner peripheral surface of the conductive member 5 is opposed to the first permanent magnets 3 and the second permanent magnets 4 with a gap therebetween.

The fixture 8a is connected to the magnet holding member 2. Therefore, the magnet holding member 2 is not rotatable around the screw shaft 7. On the other hand, the ball nut 6 is connected to the conductive member 5. Accordingly, when the ball nut 6 is rotated, the conductive member 5 rotates. Even in such a configuration, since the first permanent magnets 3 and the second permanent magnets 4, which are integral with the magnet holding member 2, rotate relative to the conductive member 5 as described above, eddy currents are generated in the conductive member 5. As a result, a damping force is generated in the eddy current damper 1, thereby enabling to dampen vibration.

Fourth Embodiment

In an eddy current damper of a fourth embodiment, the conductive member is arranged inside the magnet holding member, and is not rotatable. Eddy currents are generated as a result of rotation of the magnet holding member in the outside.

Figure 16:
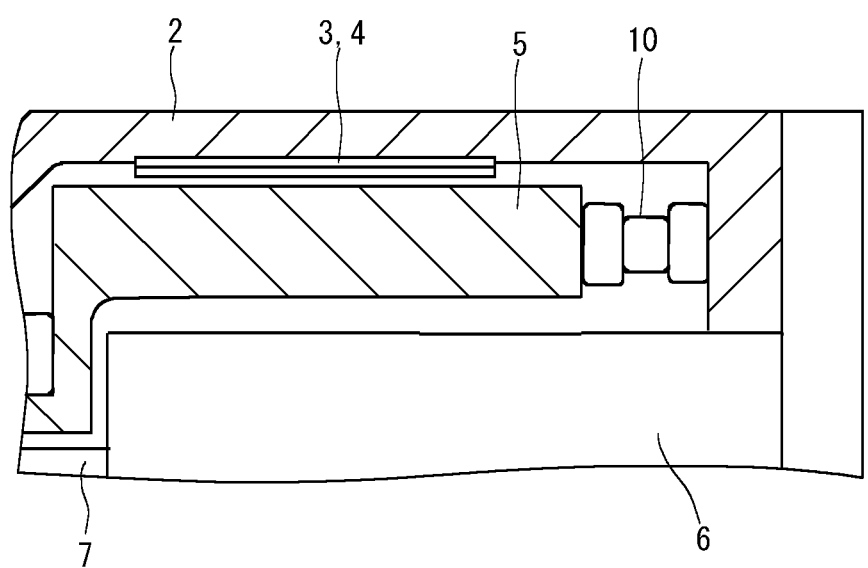
FIG. 16 is a sectional view taken in a plane along the axial direction of an eddy current damper of a fourth embodiment.

FIG. 16 is a sectional view taken in a plane along the axial direction of the eddy current damper of the fourth embodiment. Referring to FIG. 16, a magnet holding member 2 can accommodate a conductive member 5, a ball nut 6 and a screw shaft 7. First permanent magnets 3 and second permanent magnets 4 are attached to the inner peripheral surface of the magnet holding member 2. Therefore, the outer peripheral surface of the conductive member 5 is opposed to the first permanent magnets 3 and the second permanent magnets 4 with a gap therebetween.

The fixture 8a shown in FIG. 2 is connected to the conductive member 5. Therefore, the conductive member 5 is not rotatable around the screw shaft 7. On the other hand, the ball nut 6 is fixed to the magnet holding member 2. Therefore, when the ball nut 6 is rotated, the magnet holding member 2 rotates. Even in such a configuration, since the first permanent magnets 3 and the second permanent magnets 4, which are integral with the magnet holding member 2, rotate relative to the conductive member 5 as described above, eddy currents are generated in the conductive member 5. As a result, a damping force is generated in the eddy current damper 1, thereby enabling to dampen vibration.

As described above, when the eddy current damper generates a damping force, the temperature of the conductive member rises. The first permanent magnets and the second permanent magnets are opposed to the conductive member. Therefore, the temperature of the first permanent magnets and the second permanent magnets may rise due to radiant heat from the conductive member. If the temperature of the permanent magnets increases, the magnetic force may decrease.

In the eddy current damper according to the first embodiment, the conductive member 5 is arranged outside the magnet holding member 2. In other words, the conductive member 5 is arranged on the outermost side, and is in contact with the outside air. In this way, the conductive member 5 is cooled by the outside air. Therefore, the temperature rise of the conductive member 5 can be suppressed. As a result, the temperature rises of the first permanent magnets and the second permanent magnets can be suppressed.

In the eddy current damper according to the second embodiment, the magnet holding member 2 is arranged outside the conductive member 5. In other words, the magnet holding member 2 is arranged on the outermost side and comes into contact with the outside air. In this way, the magnet holding member 2 is cooled by the outside air. Therefore, the first permanent magnets and the second permanent magnets can be cooled through the magnet holding member 2. As a result, the temperature rises of the first permanent magnets and the second permanent magnets can be suppressed.

In the eddy current damper of the third embodiment, the conductive member 5 is arranged outside the magnet holding member 2. In other words, the conductive member 5 is arranged on the outermost side, and is in contact with the outside air. Further, the conductive member 5 is rotatable around the screw shaft 7. In this way, the rotating conductive member 5 is efficiently cooled by the outside air. Therefore, the temperature rise of the conductive member 5 can be suppressed. As a result, the temperature rises of the first permanent magnets and the second permanent magnets can be suppressed.

In the eddy current damper according to the fourth embodiment, the magnet holding member 2 is arranged outside the conductive member 5. In other words, the magnet holding member 2 is arranged on the outermost side, and is contact with the outside air. Further, the magnet holding member 2 is rotatable around the screw shaft 7. In this way, the rotating magnet holding member 2 is efficiently cooled by the outside air. Therefore, the first permanent magnets 3 and the second permanent magnets 4 can be cooled through the magnet holding member 2. As a result, the temperature rises of the first permanent magnets and the second permanent magnets can be suppressed.

Referring to FIG. 14, in the eddy current damper of the third embodiment, an additional weight made of, for example, a steel material may be applied to the conductive member 5 which is arranged on the outermost side. When the axial movement of the screw shaft 7 is converted into the rotational motion of the ball nut 6, the rotational motion of the ball nut 6 is transmitted to the conductive member 5 integral with the ball nut 6. As a result, the conductive member 5 rotates around the axis of the ball screw. The inertia mass of the conductive member 5 is increased by the additional weight. In other words, the moment of inertia of the conductive member 5 around the axis of the ball screw is increased by the additional weight. As a result, the ball nut 6 becomes harder to rotate, the axial movement of the screw shaft 7 is hindered, and thus the vibration of the building can be further suppressed.

Referring to FIG. 16, in the eddy current damper according to the fourth embodiment, an additional weight made of, for example, a steel material may be applied to the magnet holding member 2 arranged on the outermost side. Similarly as described above, since the moment of inertia of the magnet holding member 2 around the axis of the ball screw is increased by the additional weight, the vibration of the building can be further suppressed.

When the additional weight is applied to positively increase the moment of inertia of the conductive member 5 or the magnet holding member 2, at least one of the two fixtures 8a and 8b may be attached to the first connecting member EN1 or the second connecting member EN2 via the elastic body (see FIG. 1). When the fixture is attached to the connecting member via the elastic body, the elastic body further hinders the axial movement of the screw shaft 7, thus enabling to further suppress the vibration of the building. In other words, the elastic body constitutes an additional vibration system in the eddy current damper. The elastic body is, for example, natural rubber or a disc spring.

So far, the eddy current damper of the present embodiment has been described. Since an eddy current is generated by the change of the magnetic flux passing through the conductive member 5, the first permanent magnet 3 and the second permanent magnet 4 may be rotated relative to the conductive member 5. In addition, as long as the conductive member 5 exists in the magnetic field generated by the first permanent magnet 3 and the second permanent magnet 4, the positional relationship between the conductive member and the magnet holding member is not particularly limited.

In addition, it goes without saying that the present invention is not limited to the above described embodiments, and various modifications can be made without departing from the spirit of the present invention.

INDUSTRIAL APPLICABILITY

The eddy current damper of the present invention is useful for vibration control devices and seismic isolation devices of buildings.

REFERENCE SIGNS LIST

1: Eddy current damper
2: Magnet holding member
3: First permanent magnet
4: Second permanent magnet
5: Conductive member
6: Ball nut
7: Screw shaft
8a, 8b: Fixture
9: Radial bearing
10: Thrust bearing
11: Pole Piece

The invention claimed is:

1. An eddy current damper, comprising:
a screw shaft movable in an axial direction;
a plurality of first permanent magnets arrayed along a circumferential direction around the screw shaft;
a plurality of second permanent magnets each arranged between the first permanent magnets leaving gaps with the first permanent magnets, wherein arrangement of magnetic poles is inverted between the second permanent magnets and the first permanent magnets;
a cylindrical magnet holding member for holding the first permanent magnets and the second permanent magnets;
a cylindrical conductive member which has conductivity and is opposed to the first permanent magnets and the second permanent magnets with a gap between the conductive member, and the first permanent magnets and the second permanent magnets; and
a ball nut which is arranged inside the magnet holding member and the conductive member and meshes with the screw shaft, wherein
the magnet holding member is arranged inside the conductive member,
the first permanent magnets and the second permanent magnets are attached to an outer peripheral surface of the magnet holding member,
the ball nut is fixed to the magnet holding member, and
the eddy current damper includes:
a distal end side bearing attached to an inner peripheral surface of the conductive member at a position closer to the distal end side of the screw shaft than the first permanent magnets and the second permanent magnets, the distal end side bearing supporting the outer peripheral surface of the magnet holding member; and
a root side bearing attached to the inner peripheral surface of the conductive member at a position closer to the root side of the screw shaft than the first permanent magnets and the second permanent magnets, the root side bearing supporting the outer peripheral surface of the magnet holding member.

2. The eddy current damper according to claim 1, wherein
the first permanent magnets are arranged in a plurality of rows along an axial direction of the magnet holding member, and
the second permanent magnets are arranged in a plurality of rows along the axial direction of the magnet holding member.

3. An eddy current damper, comprising:
a screw shaft movable in an axial direction;
a plurality of first permanent magnets arrayed along a circumferential direction around the screw shaft;
a plurality of second permanent magnets each arranged between the first permanent magnets leaving gaps with the first permanent magnets, wherein arrangement of magnetic poles is inverted between the second permanent magnets and the first permanent magnets;

a cylindrical magnet holding member for holding the first permanent magnets and the second permanent magnets;

a cylindrical conductive member which has conductivity and is opposed to the first permanent magnets and the second permanent magnets with a gap between the conductive member, and the first permanent magnets and the second permanent magnets; and a ball nut which is arranged inside the magnet holding member and the conductive member and meshes with the screw shaft, wherein the conductive member is arranged inside the magnet holding member, the first permanent magnets and the second permanent magnets are attached to an inner peripheral surface of the magnet holding member, the ball nut is fixed to the conductive member, and the eddy current damper includes:

a distal end side bearing attached to the inner peripheral surface of the magnet holding member at a position closer to the distal end side of the screw shaft than the first permanent magnets and the second permanent magnets, the distal end side bearing supporting an outer peripheral surface of the conductive member; and a root side bearing attached to the inner peripheral surface of the magnet holding member at a position closer to the root side of the screw shaft than the first permanent magnets and the second permanent magnets, the root side bearing supporting the outer peripheral surface of the conductive member.

4. The eddy current damper according to claim 3, wherein the first permanent magnets are arranged in a plurality of rows along an axial direction of the magnet holding member, and the second permanent magnets are arranged in a plurality of rows along the axial direction of the magnet holding member.

* * * * *